Feb. 22, 1938.   S. KALKO   2,109,174
VARIABLE SPEED TRANSMISSION
Filed Dec. 30, 1936   2 Sheets-Sheet 1
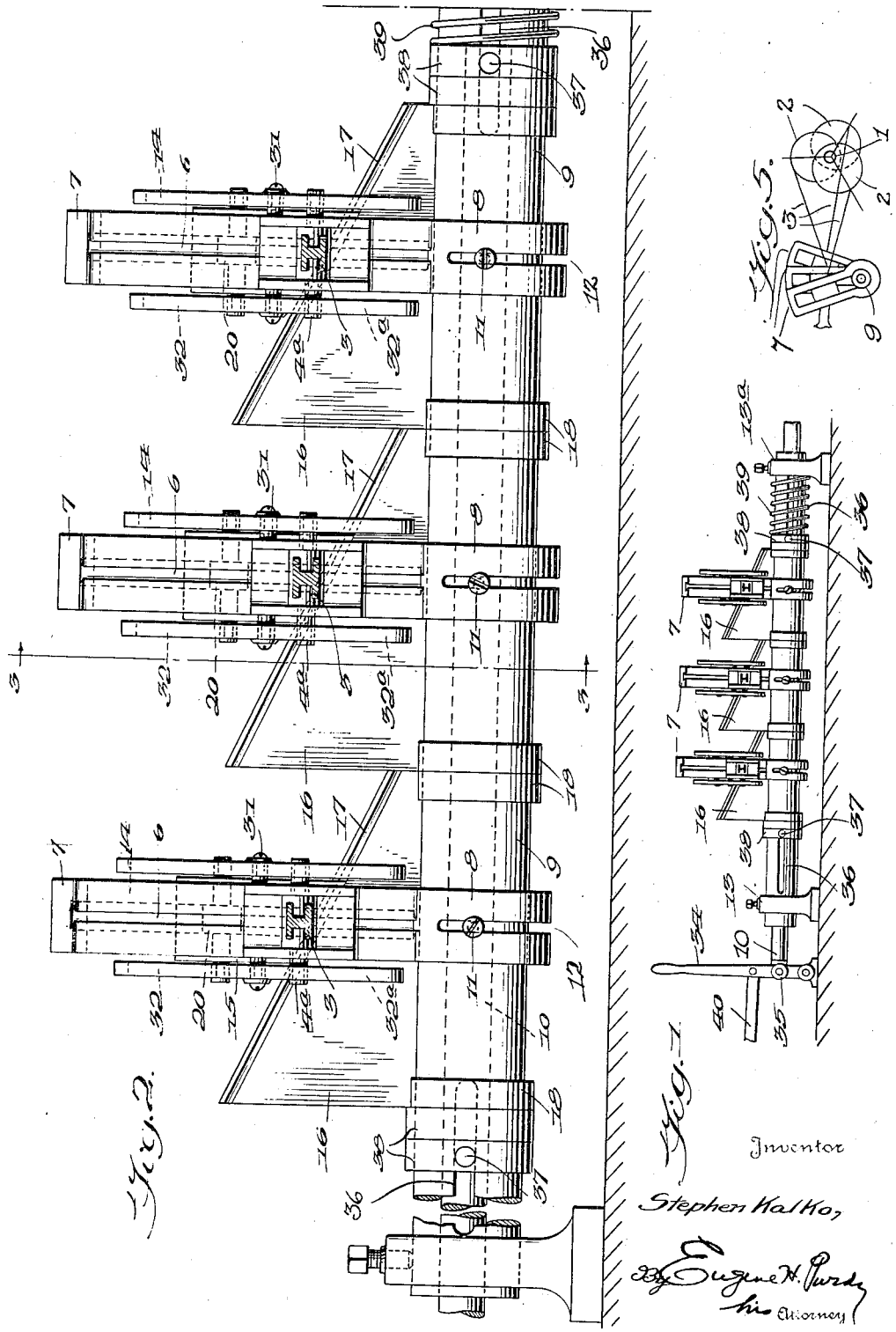
Inventor
Stephen Kalko,
By Eugene H. Purdy
his Attorney Feb. 22, 1938.    S. KALKO    2,109,174
VARIABLE SPEED TRANSMISSION
Filed Dec. 30, 1936    2 Sheets-Sheet 2
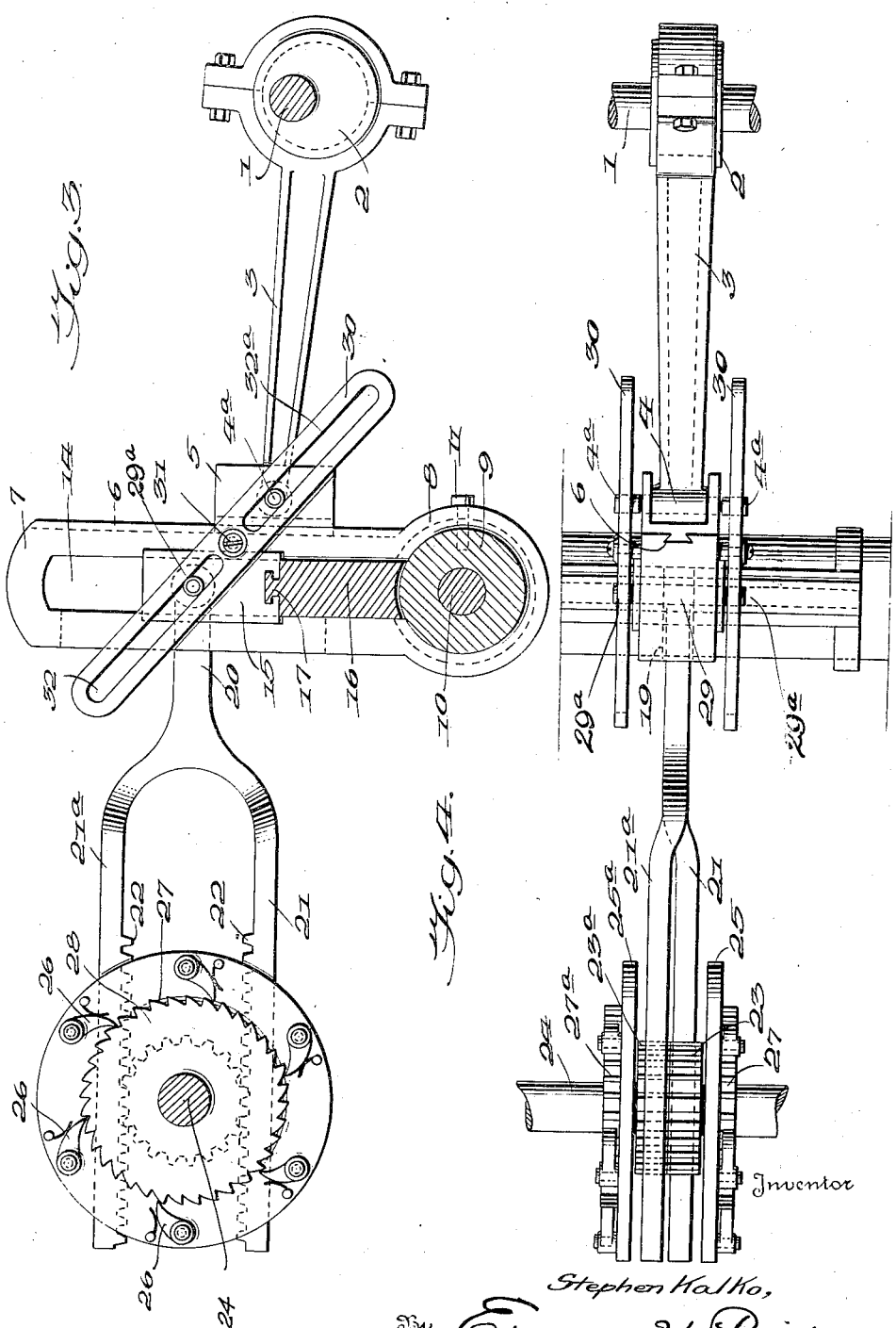
Stephen Kalko,
By Eugene K. Purdy
his Attorney Patented Feb. 22, 1938

2,109,174

UNITED STATES PATENT OFFICE 2,109,174

VARIABLE SPEED TRANSMISSION

Stephen Kalko, Bordentown Township, Burlington County, N. J.

Application December 30, 1936, Serial No. 118,351

9 Claims. (Cl. 74—119)

This invention relates to variable speed transmissions, and more particularly to transmissions of the type in which motion is communicated from a continuously rotating drive shaft through an oscillatable rocker arm to a driven shaft, the latter shaft being rotated either continuously or intermittently.

An important object of my invention is to provide a transmission of the above character in which the speed ratios between the drive and driven shafts may be quickly and conveniently adjusted by a simple manual operation without interrupting the operation of the mechanism. According to the preferred form of my invention, this object is accomplished by means of an adjustable cam plate so constructed and arranged that a relatively slight displacement of the latter results in an amplified change in the speed ratio of the drive and driven shafts.

A further object of my invention is to provide a transmission of the above character embodying a rocker arm and a rack bar pivoted to the rocker arm, including a novel form of ratchet mechanism for imparting substantially continuous unidirectional rotary movement to the driven shaft.

Another object of my invention is to provide a plurality of transmissions adapted to be arranged in parallel relation and capable of simultaneous adjustment by means of a common operating lever.

Other objects and advantages will be apparent from the following detailed description of a preferred embodiment of my invention, reference being had to the annexed sheets of drawings in which:

Figure 1 shows a multiple transmission arrangement in which the individual rocker arms are mounted in parallel upon a common shaft intermediate the drive and driven shafts;
Figure 2 is an enlarged incomplete view of the multiple transmission arrangement of Fig. 1;

Figure 3 is a view in side elevation of one of the transmissions viewed on the line 3—3 of Fig. 2;
Figure 4 is a plan view of the transmission shown in Fig. 3; and Figure 5 is a diagrammatic view of a modified arrangement of the multiple transmissions.

As illustrated in the drawings each of the speed transmissions comprises a continuously rotating shaft 1 upon which is fixed an eccentric 2 with which is operatively associated a connecting rod 3. The free end of the connecting rod is pivoted by a pin 4 to a slide block 5 adapted to be adjusted within a grooved track 6 extending along one side of a rocker arm 7. The rocker arm is formed at its lower end with a collar 8 mounted for pivotal movement about a stationary hollow shaft 9 enclosing a sliding shaft 10. The collar 8 is retained by a pin 11 extending through a circumferential slot 12 (Fig. 2) in the collar to permit oscillation of the collar on shaft 9. The shaft 9 is fixedly retained by pillow blocks 13 and 13a in parallel spaced relation to shaft 1. The rocker arm 7 is formed with a straight slot 14 extending throughout the major portion of its length and slidably adjustable lengthwise within this slot is a second slide block 15. For raising and lowering the slide block 15 a wedge member 16, having a key connection 17 with the under side of the slide block, is disposed within the lower end of the slot. The wedge member is integrally provided adjacent its ends with rings 18 which encircle and slide upon the shaft 9 so that by moving the wedge member crosswise of the slot, by means which will be later described, the slide block 15 is shifted upwardly or downwardly, as desired.

Extending through an elongated opening 19 in the side of the rocker arm opposite the track 6 and having its end pivotally coupled by a pin 29 to slide block 15 is a pitman 20. The opposite end of this pitman is bifurcated so as to provide a pair of laterally offset rack bars 21 and 21a. The opposed faces of these rack bars are formed with teeth 22 so as to engage the complementary teeth of a pair of pinions 23 and 23a arranged side by side and freely rotatable upon a driven shaft 24. These pinions are fastened to reversely disposed faces of adjacently located clutch disks 25 and 25a carrying at circumferentially spaced intervals a plurality of spring-pressed pawls 26. The pawls of clutch disk 25 in one direction of rotation of the pinion 23 are designed to operatively engage the teeth of a ratchet wheel 27 and impart rotation thereto and in the opposite direction of rotation of the pinion 23 to slide idly over the ratchet teeth. Similarly the pawls associated with clutch disk 25a will engage a companion ratchet wheel 27a and impart rotation thereto upon rotation of pinion 23a in one direction only. The ratchet wheels are connected to shaft 24 so that rotation of the ratchet wheels imparts rotation to this shaft. Since, as shown in the drawings, rack bars 21 and 21a engage diametrically opposite points upon the circumferences of the pinions 23 and 23a, reciprocation of the pitman 20 will cause these rack bars to drive the clutch disks in the same direction, but owing to the fact that the ratchet wheels 27 and

27a become alternately operative as the rack bars reverse their direction of travel, substantially continuous unidirectional rotation will be imparted to the shaft 24.

Preferably the pawls of the two clutch disks are so spaced apart that certain of them will always be in effective engagement with the teeth of their respective ratchet wheels regardless of the relative positions of the companion clutch disks and ratchet wheels, thus avoiding lost motion in the ratchets. Driven shaft 24 may actuate any suitable mechanism, such for example as a feed roll wherein a continuous web of material is fed to a reciprocating cutter, not shown, with a pulsating movement and having successive instantaneous periods of rest during which the cutter operates to sever the material.

For modifying the rotation imparted to the pinions 23 and 23a and hence to the shaft 24 during each reciprocation of the pitman 20, adjusting means are provided to vary the distances of the pivots of the connecting rod 3 and pitman 20 from the axis of oscillation of the rocker arm 7. For this purpose there is duplicated upon opposite sides of the rocker arm an elongated cam plate 30 which is intermediately pivoted to the rocker arm at 31 at one side of the slot 14 approximately midway of its length. Each cam plate is provided with two straight aligned guide slots 32 and 32a together extending throughout a substantial portion of its length and these slots being located at opposite sides of the pivot 31. Pins 4a, which may form extensions of the pin 4 pivoting the connecting rod to slide block 5, project laterally outward from the sides of the slide block 5 and enter slots 32a in the cam plates, and these pins are provided with antifriction rollers of a diameter adapted to snugly fit the slots. Similarly the slide block 15, to which the pitman 20 is pivoted, is provided with laterally projecting pivot pins 29a, constituting extensions of pin 29. The latter pins carry antifriction rollers which are received in the slots 32 of the cam plates at the other side of their pivots 31.

As indicated in Figs. 1 and 2 a plurality of these transmissions may be arranged in parallel spaced relation upon the stationary shaft 9 for rotating a plurality of independent driven shafts 24. In this case the several counterpart wedge members abut each other in a connected series so as to be collectively operable to shift the cam plate 30 of each rocker arm. For sliding the wedge members lengthwise along the shaft, there is provided a hand lever 34 pivoted at its lower end and having a pin connection at 35 with the shaft 10 which is enclosed by and slides within hollow shaft 9. Elongated slots 36 are provided through the wall of the hollow shaft 9 in the direction of its length and projecting through these slots from the inner shaft 10 are lugs 37 coupled to collars 38 abutting the rings 18 of the leading and trailing wedge members 16 of the series so that when the inner shaft is slid within the outer hollow shaft the wedge members will be urged in the direction in which the inner shaft is moved. A spring 39 encircling the hollow shaft 9 and compressed between pillow block 13a and collar 38 adjacent the end of the shaft opposite the hand lever 34 will tend to bias the series of wedge members to the left (Fig. 1). The hand lever is provided with an arm 40 adapted to be latched by means not shown to maintain the hand lever, and hence the wedge blocks, in any desired position of adjustment. The rocker arms 7 need not oscillate exactly in phase but, as diagrammatically illustrated in Fig. 5, the eccentrics 2 may be angularly displaced relative to each, for example at 120°, so that the rocker arms occupy different positions along their arc of swinging movement at any instant. In this case the abutting ends of the wedge members rub against each other in the rocking movement of the rocker shafts. A series of transmissions so arranged may cooperate to impart substantially uniform unidirectional rotation to a common driven shaft 24, if desired, the structure otherwise being the same as that heretofore described.

The operation of the variable speed transmission described is as follows: During rotation of the shaft 1, the rocker arm 7 will be oscillated on the stationary shaft 9 by the connecting rod 3, and the motion of the rocker arm will be transmitted through clutch disks 25 and 25a and driven shaft 24 by the pitman 20 and rack bars 21 and 21a. When, through operation of the handle 34 the wedge members 16 are shifted in a direction to raise the slide blocks 15, the pivot of the pitman 20 with this slide block is moved away from the axis of oscillation of the rocker arm. This swings the cam plates clockwise (Fig. 3) forcing the slide blocks 5 downwardly nearer to the axis of oscillation of the rocker arms. Thus the arc of swinging movement of the rocker arms is increased as is also the distance of travel of the pitmans 20 by reason of the location of their pivots farther away from the axis of oscillation of the rocker arms.

It will be apparent that by moving the wedge members a comparatively short distance an amplified change in speed ratios between the drive and driven shafts is obtained. This is important when the transmissions are arranged in parallel because the wedge members may be made comparatively short in length to permit the closer spacing of the individual transmissions. By this dual adjustment of the pitman and connecting rod along the rocker arm, the latter may be made considerably shorter in length than where the adjustment is effected, as has heretofore been the practice, by adjusting only the pivot of the connecting rod along the rocker shaft, and this also reduces the inertia of the mechanism. Furthermore, in the multiple operation of machines, the invention provides a convenient means for simultaneously adjusting the speed of the machines in exact predetermined relation to each other and without interrupting their operation.

While I have shown an eccentric as operating the rocker shaft obviously other means, such as a crank or piston, for imparting reciprocating motion will serve equally as well. Also by omitting one of the rack bars upon the pitman 20 and its companion ratchet mechanism, intermittent motion instead of substantially continuous motion may be imparted to the driven shaft. In lieu of the ratchet mechanism for communicating motion from the rack bars to the driven shaft, other mechanisms known to the art may be employed.

It will be apparent that my invention may be embodied in other forms than that shown and described herein and that various changes in structural details and arrangement may be made from the example herein disclosed without departing from the spirit of my invention.

I claim:

1. A variable speed transmission comprising a drive shaft and a driven shaft, a connecting rod adapted to be reciprocated by the drive shaft, a pitman adapted to impart rotation to the driven shaft, and a rocker arm intermediate the connecting rod and link, said rocker arm having a cam plate pivotally supported thereon, pivots adjustable along said rocker arm for connecting said connecting rod and pitman to the rocker arm, said cam plate being swingable to simultaneously vary the positions of the pivots lengthwise of the rocker arm, and means for imparting swinging movement to said cam plate.

2. A variable speed transmission comprising a drive shaft and a driven shaft, a connecting rod adapted to be reciprocated by the drive shaft, a pitman adapted to impart rotation to the driven shaft and a rocker arm intermediate the connecting rod and pitman, said rocker arm having a cam plate pivotally supported thereon, a pair of slide blocks upon the rocker arm located at opposite sides of the pivot of the cam plate and independently mounted for travel along the rocker arm toward and away from its axis of oscillation, means pivotally connecting said connecting rod and pitman to the respective slide blocks, interengaging means between said slide blocks and cam plate, said cam plate being swingable to move the blocks in opposite directions along the rocker arm, and means for imparting swinging movement to said cam plate.

3. A variable speed transmission comprising a drive shaft and a driven shaft, a connecting rod adapted to be reciprocated by the drive shaft, a pitman adapted to impart rotation to the driven shaft, and a rocker arm intermediate the connecting rod and pitman, said rocker arm having a slotted cam plate pivotally supported thereon, a pair of slide blocks located upon the rocker arm at opposite sides of the pivot of the cam plate and independently mounted for travel along the rocker arm toward and away from its axis of oscillation, means pivotally connecting said connecting rod and pitman to the respective slide blocks, interengaging means between said slide blocks and cam plate, said cam plate being swingable to move the blocks in opposite directions along the rocker arm, and a shiftable member for imparting swinging movement to said cam plate.

4. A variable speed transmission comprising a drive shaft and a driven shaft, a connecting rod adapted to be reciprocated by the drive shaft, a pitman adapted to impart rotation to the driven shaft, and a rocker arm intermediate the connecting rod and pitman, said rocker arm having a slotted cam plate pivotally supported thereon, a pair of slide blocks upon the rocker arm located at opposite sides of the pivot of the cam plate and independently mounted for travel along the rocker arm toward and away from its axis of oscillation, means pivotally connecting the connecting rod and pitman to the respective slide blocks, and interengaging means between said slide blocks and cam plate, and a wedge member keyed to one of the slide blocks and shiftable to raise and lower said latter slide block and to cause said cam plate to move the other slide block in an opposite direction along the rocker arm.

5. A multiple transmission mechanism comprising a series of transmissions arranged in parallel relation, a common drive shaft and a common driven shaft, each of said transmissions including a connecting rod adapted to be reciprocated by the drive shaft, a pitman adapted to impart rotation to the driven shaft and a rocker arm supported upon a rocker arm shaft intermediate the drive shaft and driven shaft, said rocker arm having a cam plate pivotally supported thereon, pivots adjustable along said rocker arm, said pivots connecting said connecting rod and pitman to the rocker arm and operatively associated with the cam plate whereby swinging movement of the cam plate acts to simultaneously vary the positions of the pivots along the rocker arm, and means for simultaneously imparting swinging movement to the cam plates of the rocker arms included within said series of transmissions.

6. A multiple transmission mechanism comprising a series of transmissions arranged in parallel relation, a common drive shaft and a common driven shaft, and each of said transmissions including a connecting rod adapted to be reciprocated by the drive shaft, a pitman adapted to impart rotation to the driven shaft, and a rocker arm supported upon a rocker arm shaft intermediate the drive shaft and driven shafts, said rocker arm having a cam plate pivotally supported thereon, a pair of slide blocks upon the rocker arm located at opposite sides of the pivot of the cam plate and independently mounted for travel along the rocker arm toward and away from its axis of oscillation, means pivotally connecting said connecting rod and pitman to the respective slide blocks, interengaging means between said slide blocks and cam plate, a series of abutting wedge members extending lengthwise of the rocker arm shaft and each of said wedge members being keyed to a slide block of each transmission, and means for shifting said series of wedge members to simultaneously move the slide blocks in opposite directions along the rocker shafts.

7. A variable speed mechanism comprising a rocker arm, a connecting rod for oscillating the rocker arm, a pitman actuated by the rocker arm, adjustable pivots operatively connecting said connecting rod and pitman to the rocker arm, a cam plate mounted upon said rocker arm and engageable with said pivots said cam plate being displaceable to simultaneously vary the positions of said pivots relative to the axis of oscillation of the rocker arm, and means for causing displacement of said rocker arm.

8. A multiple transmission mechanism comprising a common drive shaft and a common driven shaft, a plurality of transmissions arranged in parallel and located intermediate the drive and driven shafts, each of said transmissions comprising a connecting rod adapted to be reciprocated by the drive shaft and a rocker arm supported upon a rocker arm shaft located intermediate the drive and driven shafts, a slidable block movable longitudinally of the rocker arm, pivots connecting the connecting rod and pitman to the rocker arm, and one of said pivots being carried by the slide block, said plurality of rocker arms being angularly offset in out-of-phase relation about their axes of oscillation, a plurality of independently-rockable wedge members arranged end-to-end and engaging the slide blocks, and manual means for shifting the series of wedge members longitudinally to simultaneously and correspondingly adjust the positions of the slide blocks toward and from the axes of oscillation of the rocker arms.

9. A multiple transmission mechanism comprising a common drive shaft and a common driven shaft, a plurality of transmissions arranged in parallel and located intermediate the drive shaft and driven shaft, each of said transmissions comprising a connecting rod adapted to be reciprocated by the drive shaft, a pitman adapted to impart rotation to the driven shaft and a rocker arm supported intermediate the drive and driven shafts, pivots connecting the connecting rod and pitman to the rocker arm, a cam plate operatively associated with the pivots whereby movement of said cam plate varies the distances of said pivots toward or from the axis of oscillation of the rocker arm, a rack carried by the pitman, a one-way clutch supported upon the driven shaft and operable by the rack in its travel to impart unidirectional rotation to the driven shaft, said rocker arms being angularly offset in out-of-phase relation about their axes of oscillation and a plurality of shiftable wedge members for simultaneously imparting movement to said cam plates.

STEPHEN KALKO.